United States Patent [19]
Markyvech et al.

[11] Patent Number: 6,134,889
[45] Date of Patent: Oct. 24, 2000

[54] VARIABLE GEOMETRY TURBOCHARGING SYSTEM AND METHOD

[75] Inventors: Craig R. Markyvech, Romulus; Joseph A. Williamson, Warren; Kyle G. Wick, Canton; Paul L. Powell, III, Livonia, all of Mich.

[73] Assignee: Detroit Diesel Corporation, Detroit, Mich.

[21] Appl. No.: 09/301,189

[22] Filed: Apr. 28, 1999

[51] Int. Cl.⁷ .................................................. F02D 23/00
[52] U.S. Cl. ............................................................ 60/602
[58] Field of Search ............................................... 60/602

[56] References Cited

U.S. PATENT DOCUMENTS

| | | |
|---|---|---|
| 4,075,849 | 2/1978 | Richardson . |
| 4,203,296 | 5/1980 | Tanaka et al. . |
| 4,292,806 | 10/1981 | Moore et al. . |
| 4,305,105 | 12/1981 | Ho et al. . |
| 4,397,285 | 8/1983 | O'Neill . |
| 4,428,199 | 1/1984 | Moore et al. . |
| 4,442,672 | 4/1984 | Fischer . |
| 4,467,607 | 8/1984 | Rydquist et al. . |
| 4,489,557 | 12/1984 | Fawcett et al. . |
| 4,671,068 | 6/1987 | Moody et al. . |
| 4,679,398 | 7/1987 | Nishiguchi et al. . |
| 4,680,933 | 7/1987 | Bozung et al. . |
| 4,697,421 | 10/1987 | Otobe et al. . |
| 4,741,163 | 5/1988 | Hidaka et al. . |
| 4,745,755 | 5/1988 | Kawamura . |
| 4,779,423 | 10/1988 | Szczupak . |
| 4,795,928 | 1/1989 | Suzuki et al. . |
| 4,848,086 | 7/1989 | Inoue et al. . |
| 4,882,508 | 11/1989 | Mawla . |
| 4,953,110 | 8/1990 | Chartrand . |
| 5,069,194 | 12/1991 | Deutschmann et al. . |
| 5,123,246 | 6/1992 | Younessi et al. . |
| 5,148,364 | 9/1992 | Scherer . |
| 5,186,081 | 2/1993 | Richardson . |
| 5,231,830 | 8/1993 | Entenmann et al. . |
| 5,261,236 | 11/1993 | Ironside et al. . |
| 5,331,469 | 7/1994 | Andrews . |
| 5,445,128 | 8/1995 | Letang et al. . |
| 5,448,437 | 9/1995 | Katahara . |
| 5,477,827 | 12/1995 | Weisman, II et al. . |
| 5,622,053 | 4/1997 | Freen . |
| 5,709,192 | 1/1998 | Zimmermann . |
| 5,748,410 | 5/1998 | Briggs et al. . |
| 5,769,052 | 6/1998 | Oestreicher et al. . |
| 5,771,867 | 6/1998 | Amstutz et al. . |
| 5,791,145 | 8/1998 | Freen . |
| 5,798,582 | 8/1998 | Neff . |
| 6,010,476 | 1/2000 | Saadat ....................................... 604/22 |

FOREIGN PATENT DOCUMENTS

| | | |
|---|---|---|
| 5-276789 | 10/1993 | Japan . |
| WO/97/45633 | 12/1997 | WIPO . |

OTHER PUBLICATIONS

Arnold, Steve, SAE Technical Paper Series 870296, "Schwitzer Variable Geometry Turbo and Microprocessor Control Design and Evaluation", 1987.

Jain, Dilip, SAE Technical Paper Series 900889, "Electronic Control of a Variable Geometry Turbocharger", 1990.

Schulmeister, R., et al., "Advanced Diesel Engines With Integrated Electronic Systems", IMechE, 1991, C430/012, Germany.

*Primary Examiner*—Noah P. Kamen
*Attorney, Agent, or Firm*—Brooks Kushman P.C.

[57] ABSTRACT

A variable geometry turbocharging system for use in an internal combustion engine utilizes a voice coil assembly. The voice coil assembly includes a field and an armature. The voice coil assembly is actuatable to move the armature relative to the field, and is connected to the turbocharger such that movement of the armature relative to the field changes the geometry of the turbocharger.

25 Claims, 3 Drawing Sheets

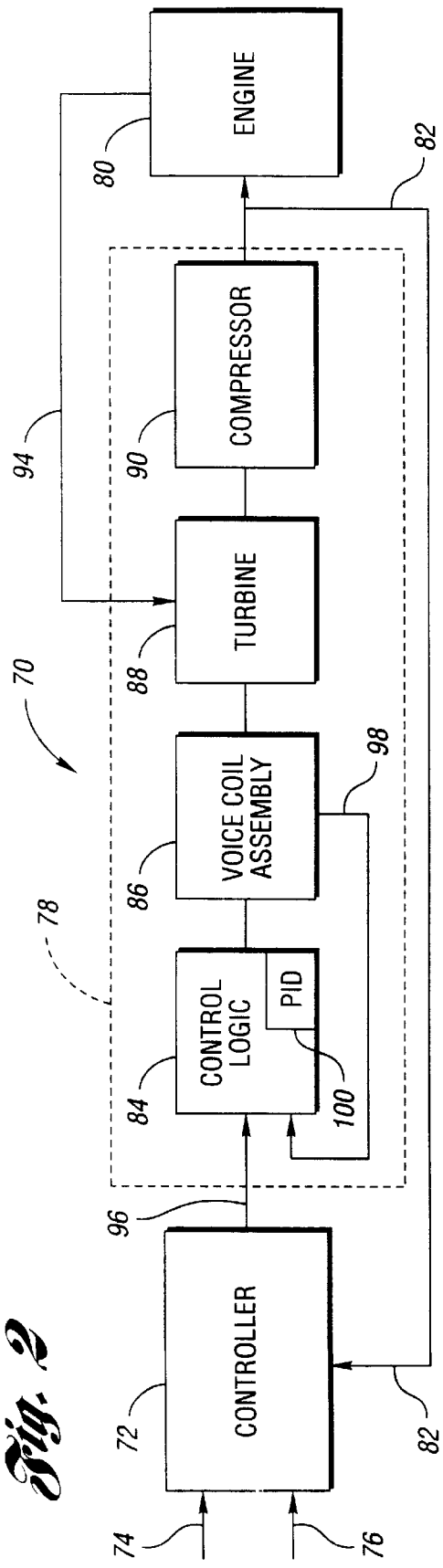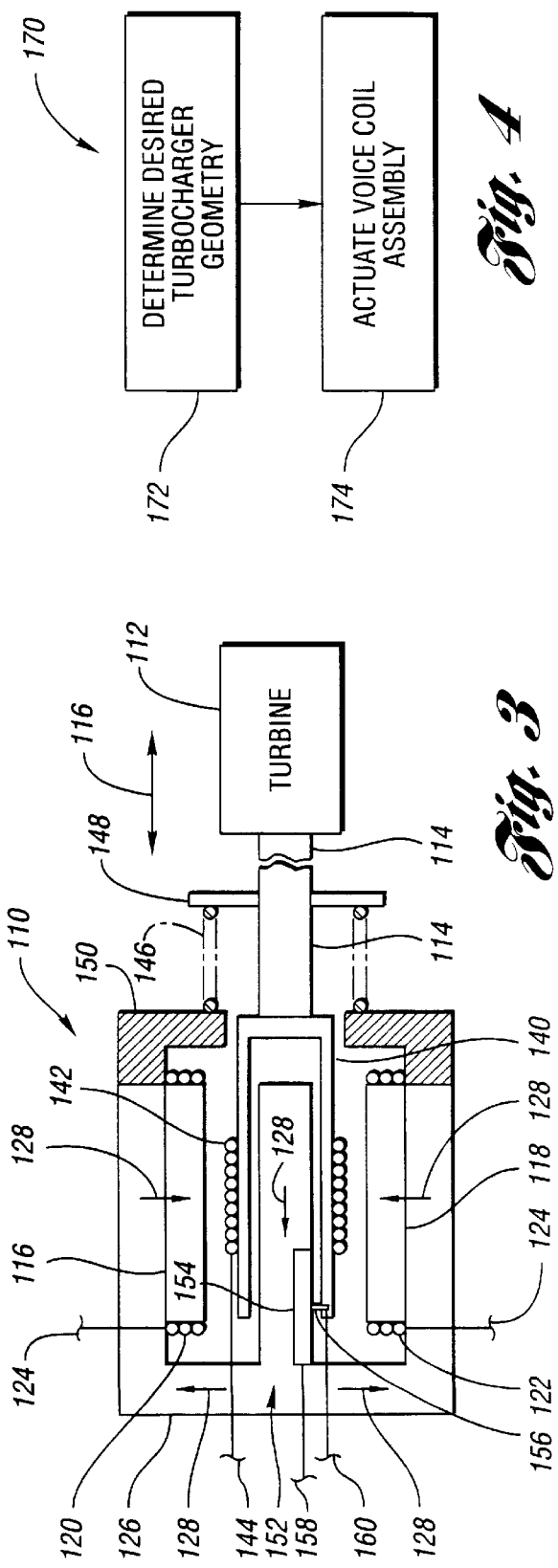

VARIABLE GEOMETRY TURBOCHARGING SYSTEM AND METHOD

TECHNICAL FIELD

The present invention relates to variable geometry turbocharger (VGT) systems and methods for use in a vehicle having an internal combustion engine.

BACKGROUND ART

In the control of internal combustion engines, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units to control various functions, which may include various aspects of fuel delivery, transmission control, turbocharger control, or many other functions.

A turbocharger consists of a turbine and a compressor. The pressure of the engine exhaust gases causes the turbine to spin. The turbine drives the compressor, which is typically mounted on the same shaft. The spinning compressor creates turbo boost pressure which develops increased power during combustion.

A variable geometry turbocharger has movable components in addition to the rotor group. These movable components can change the turbocharger geometry by changing the area or areas in the turbine stage through which exhaust gases from the engine flow, and/or changing the angle at which the exhaust gases enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a variable geometry turbocharger, the turbine housing is oversized for an engine, and the exhaust gas flow is choked down to the desired level. There are several designs for the variable geometry turbocharger. In one design, a variable inlet nozzle has a cascade of movable vanes which are pivotable to change the area and angle at which the exhaust gas flow enters the turbine wheel. In another design, the turbocharger has a movable side wall which varies the effective cross-sectional area of the turbine housing.

A conventional variable geometry turbocharger control system utilizes an electronic controller having a boost map stored therein. The boost map contains the optimum boost for an engine as a function of engine operating conditions. The controller monitors the engine operating conditions using sensors, and determines the desired boost from the boost map. Turbocharger geometry is incrementally adjusted based on the desired boost pressure obtained from the boost map by actuating or deactuating a pneumatic cylinder that drives a control arm on the variable geometry turbocharger. Moving the control arm causes the turbocharger geometry to change. Typically, the pneumatic cylinder is driven in an open loop fashion in accordance with the boost map.

A primary disadvantage associated with existing variable geometry turbocharger control systems is the fact that turbo boost pressure has a slow response time to incremental changes in turbocharger geometry. The slow response of turbo boost pressure is due in part to the response characteristics of the pneumatic cylinder and associated open loop control techniques. Because the optimum boost from the boost map varies continuously with varying engine operating conditions, the slow response time of the turbo boost pressure to the incremental changes in turbocharger geometry makes it difficult to obtain precise control of the turbocharger. This slow response time may sometimes render some of the emissions and driveability benefits of the variable geometry turbocharger unachievable.

DISCLOSURE OF INVENTION

It is therefore an object of the present invention to provide a variable geometry turbocharging system that utilizes a voice coil assembly to increase turbo boost pressure response time and allow more sophisticated control of the variable geometry turbocharger.

In carrying out the above object and other objects and features of the present invention, a variable geometry turbocharging system for use in an internal combustion engine including an engine controller is provided. The system comprises a variable geometry turbocharger configured with a changeable geometry, and a voice coil assembly. The voice coil assembly includes a field and an armature. The voice coil assembly is actuatable to move the armature relative to the field. The voice coil assembly is connected to the turbocharger such that movement of the armature relative to the field changes the geometry of the turbocharger.

In a preferred embodiment, the engine controller is configured to generate a signal indicative of a desired turbocharger geometry based on at least one engine operating condition. Preferably, the system further comprises control logic configured to receive the engine controller signal and to actuate the voice coil assembly in accordance with the engine controller signal. Further, preferably, the engine controller is configured to determine the desired turbocharger geometry based on at least one of the following: engine rpm, demanded engine torque, and desired boost pressure for the engine.

More preferably, the system includes a sensor configured to measure an actual boost pressure for the engine and to provide a signal to the engine controller indicative of the actual boost pressure. The engine controller is preferably configured to determine the desired turbocharger geometry based on the desired boost pressure and the actual boost pressure for the engine. More preferably, the engine controller is configured to determine the desired boost pressure from a lookup table that is indexed by at least one engine condition from the group consisting of: engine rpm and demanded engine torque. Preferably, the engine controller generates the engine controller signal indicative of the desired turbocharger geometry as a pulse width modulated signal wherein a duty cycle of the signal indicates the desired turbocharger geometry. For example, the duty cycle may range from about 5% to about 95%. Further, preferably, the voice coil assembly is connected so as to be electrically driven by a vehicle battery, and has a full motion range for the armature relative to the field of about 2.5 centimeters (1 inch). Driving the voice coil with the battery allows control at anytime, including before startup to reduce emissions.

Further, in carrying out the present invention, a variable geometry turbocharging system for use in an internal combustion engine including an engine controller configured to generate a signal indicative of a desired turbocharger geometry based on at least one engine operating condition is provided. The system comprises a variable geometry turbocharger configured with a changeable geometry, a voice coil assembly, a position sensor, and control logic. The voice coil assembly includes a field and an armature. The voice coil assembly is actuatable to move the armature relative to the field, and the voice coil assembly is connected to the turbocharger such that movement of the armature relative to the field changes the geometry of the turbocharger. The position sensor is configured to measure the position of the armature relative to the field, and has an output indicative of the measured position. The control logic is configured to receive the engine controller signal and the position sensor output, and to actuate the voice coil assembly in accordance with the engine controller signal and the position sensor output to track the turbocharger geometry to the desired turbocharger geometry.

In a preferred implementation, the position sensor comprises a linear resistive transducer including a linear resister and a wiper configured such that the wiper moves along the linear resister as the armature moves relative to the field. Preferably the wiper is fixed relative to the armature and the linear resister is fixed relative to the field. Further, preferably, the voice coil assembly and the control logic are configured to provide a full motion range (rise-time) response of at most about 150 milliseconds, or more preferably of at most about 100 milliseconds.

In a preferred embodiment, the control logic is configured to determine a position error signal based on the engine controller signal and the position sensor output and to actuate the voice coil assembly in accordance with the error signal to track turbocharger geometry to the desired turbocharger geometry. Further, preferably, the control logic is configured to actuate the voice coil assembly in accordance with the error signal and at least one time dependent control term and a proportional control term. Preferably, the at least one time dependent control term includes an integral term and a derivative term to form a PID controller. Still further, in a preferred embodiment, the armature includes a coil, and the control logic is configured to actuate the voice coil assembly by generating a pulse width modulated signal in which a duty cycle indicates the desired turbocharger geometry and applying the pulse width modulated signal to the coil.

Still further, in carrying out the present invention, a variable geometry turbocharging system comprises an internal combustion engine having a plurality of cylinders, an engine controller, a variable geometry turbocharger, and a voice coil assembly. The system further comprises a position sensor configured to measure the position of the armature relative to the field, and control logic configured to receive the engine controller signal and the position sensor output. The control logic is further configured to actuate the voice coil assembly in accordance with the engine controller signal and the position sensor output to track turbocharger geometry to the desired turbocharger geometry.

Yet further, in carrying out the present invention, a method for controlling a variable geometry turbocharging system is provided. The method comprises determining a desired turbocharger geometry based on at least one engine operating condition. The method further comprises actuating a voice coil assembly in accordance with the desired turbocharger geometry. The voice coil assembly includes a field and an armature and is actuatable to move the armature relative to the field. The voice coil assembly is connected to the turbocharger such that movement of the armature relative to the field changes the geometry of the turbocharger.

The advantages associated with embodiments of the present invention are numerous. For example, turbocharging systems and methods of the present invention are capable of controlling a variable geometry turbocharger with such precision, that turbo boost pressure is accurately controllable over a wide range of engine speeds, loads, and with a response time that is faster than existing pneumatic cylinder-based systems.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a block diagram of a closed loop control system in a preferred embodiment of the present invention which controls turbo boost pressure in a closed loop and also controls the voice coil assembly in an internal closed loop;

FIG. 3 is a schematic diagram illustrating the operating principles of the voice coil assembly in an exemplary construction;

FIG. 4 is a block diagram depicting a method of the present invention for controlling a variable geometry turbocharging system;

BEST MODE FOR CARRYING OUT THE INVENTION

Figure 1:
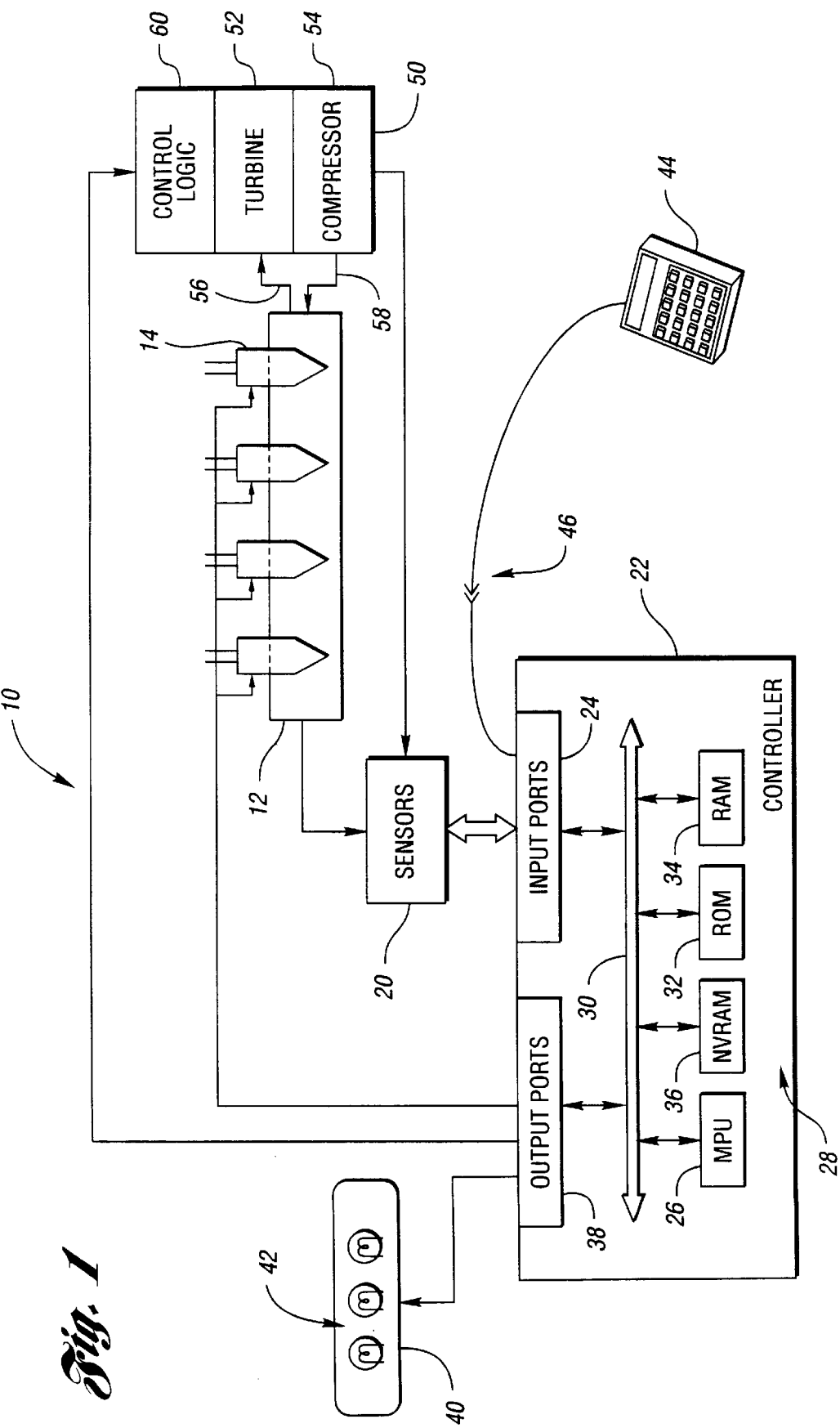
FIG. 1 is a schematic diagram of a system for controlling a vehicle having an internal combustion engine including a variable geometry turbocharger with control logic and a voice coil assembly.

Referring now to FIG. 1, a system for controlling a vehicle is shown. The system, generally indicated by reference numeral 10, includes an internal combustion engine 12 having a plurality of cylinders, each fed by a fuel injector 14 or alternatively a common rail. In a preferred embodiment, engine 12 is a compression-ignition internal combustion engine, such as a three, four, six, eight, twelve, sixteen or twenty-four-cylinder diesel engine, or a diesel engine having any other desired number of cylinders. Fuel injectors 14 receive pressurized fuel from a supply connected to one or more high or low pressure pumps (not shown) as is well known in the art. Alternatively, embodiments of the present invention may employ a plurality of unit pumps (not shown), each pump supplying fuel to one of the injectors 14.

The system 10 includes a variable geometry turbocharger 50, including a turbine 52 and a compressor 54, for drawing air into the cylinders to increase the compression ratio and create increased power during combustion. Engine exhaust is routed to the turbocharger turbine inlets along lines 56. Air drawn into the engine air intake is routed through the compressor 54 and to the engine through air inlet lines 58. It is to be understood that the single turbo turbocharging system is shown for purposes of illustration, and that systems and methods of the present invention may be employed in a multiple turbo turbocharging system. Variable geometry turbocharger 50 may be designed to vary geometry in any of a number of techniques. For example, pivotal vanes at the turbine inlet nozzle or a moveable side wall of the turbine housing may be employed to vary turbocharger geometry.

The system 10 may also include various sensors 20 for generating signals indicative of corresponding operational conditions or parameters of engine 12, the vehicle transmission (not shown), turbocharger 50, and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices such as, for example, read-only memory (ROM) 32, random access memory (RAM) 34, non-volatile random access memory (NVRAM), in addition to programmable devices such as, for example, programmable read-only (PROM), erasable programmable read-only memory (EPROM), electronically erasable programmable read-only memory (EEPROM), any of the various types of flash memory, and the like in addition to magnetic, optical, and combination media capable of temporary or permanent data storage.

Computer readable storage media 28 implement control logic via software, firmware, hardware, microcode, and/or discrete or integrated circuitry to effect control of various systems and subsystems of the vehicle, such as engine 12, a vehicle transmission (not shown), turbocharger 50, and the like. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables, control logic, look-up table values, and the like.

In operation, controller 22 receives signals from sensors 20 and executes control logic to control one or more variable geometry turbochargers by controlling a voice coil assembly to change the turbocharger geometry. Preferably, control logic 60 works in conjunction with controller 22 to control the voice coil assembly to change turbocharger geometry, as needed, based engine conditions and parameters. During testing, the controller used by the inventor was a Bosch Controller EDC 15C5-5.4.

With continuing reference to FIG. 1, a logic controller, such as microprocessor 26, controls the signals sent to the fuel injectors 14. Microprocessor 26 determines a provisional engine torque demand based on operator demand and current operating conditions. The provisional engine torque may be subject to adjustments for cylinder balancing and/or other adjustments to determine an applied engine torque demand, as desired. The signals sent to fuel injectors 14 are then based on the applied engine torque demand.

As will be appreciated by one of ordinary skill in the art, the control logic may be implemented or effected in any one or combination of a variety of control logic methodologies. The various functions are preferably effected by a programmed microprocessor in combination with control logic 60, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish features, and advantages of the present invention. The present invention is independent of the particular programming language, operating system, or processor used to implement the control logic illustrated.

Referring to FIG. 2, a variable geometry turbocharging system made in accordance with the present invention is generally indicated at 70. An engine controller 72 receives a number of inputs 74 and 76 representing a variety of different operating conditions as mentioned previously. For example, inputs 74 and 76 may represent engine rpm and demanded engine torque. The variable geometry turbocharger is indicated at 78, and the engine is indicated at 80. The outer closed loop 82 is the turbo boost pressure supplied to engine 80 from VGT 78. Actual boost pressure 82 is measured by a sensor and then supplied to controller 72. Controller 72 determines a desired boost pressure and determines engine controller signal 96, which is indicative of a desired VGT geometry, based on the desired and actual boost pressures for the engine. Preferably, the desired boost pressure is obtained from a look up table that is indexed by engine rpm and demanded engine torque 74 and 76, respectively. Signal 96 is processed at control logic 84, to allow actuation of voice coil assembly 86, resultingly changing the intake to turbine 88 from exhaust path 94 and causing changes in the output of compressor 90.

Control logic 84 receives engine controller signal 96 and actuates voice coil assembly 86 in accordance with signal 96. Preferably, a position sensor is configured to measure the position of the voice coil assembly armature to provide feedback along path 98 to control logic 84. More preferably, proportional-integral-derivative control 100 is used to track the position of the voice coil assembly armature relative to the voice coil assembly field to the desired position. The desired position for the voice coil assembly armature relative to the field is based on engine controller signal 96.

It is to be appreciated that preferred embodiments of the present invention utilized closed loop position control for voice coil assembly 86, which controls in-flow to turbine 88. Further, preferred embodiments of the present invention utilize closed loop 82 to control boost pressure delivered to the engine cylinders. The use of voice coil assembly 86 along with the preferred use of closed position loop 88 provides a fast response when it is desired to change in-flow to turbine 88. This fast response time, which has been found to be about 66 milliseconds for a full stroke range (that is, full rise-time) of the voice coil assembly in preferred implementations utilized for testing, allows a more sophisticated control of the turbocharging system than allowed by pneumatic systems.

In preferred embodiments, the inventor has found that the APECS 0250-12E2LS1 is a suitable voice coil assembly for a moveable side wall type VGT, and that the APECS 0175-12E2LS1 is a suitable voice coil assembly for a variable vane position VGT. Both of these voice coil assemblies are available from Syncrostart. Of course, it is to be appreciated by those of ordinary skill in the art that voice coil assemblies have many configurations. As such, it is to be appreciated that many different configurations of the voice coil assembly may be employed in embodiments of the present invention and the following description is meant to explain the theory of operation of the voice coil assembly and is not meant to the limit the invention to any particular voice coil assembly structure.

With reference to FIG. 3, the voice coil assembly 110 is illustrated to explain the operation theory of voice coil assemblies. Voice coil assembly 110 is used to vary the geometry of turbine 112 by moving the control arm of turbine 112 which is attached to member 114. Voice coil assembly 110 includes a field formed by a pair of electromagnets. The electromagnets are formed by ferromagnetic pieces 116 and 118, which are encircled by coils 120 and 122 respectively. Of course, it is to be appreciated that permanent magnets may be used in the alternative.

Further, it is to be appreciated that voice coil assemblies may be made with any number of magnets arranged in a variety of ways and that the particular illustration herein using two electromagnets is used to facilitate an understanding of the principles of operation of voice coil assemblies.

Member 126 is preferably shaped to form a flux path for the magnets and may be appropriately made of a transformer steel. In the embodiment illustrated, the flux path is indicated by arrows 128. Voice coil assembly 110 also includes an armature 140 with a coil 142. Armature 140 is affixed to member 114 such that movement of armature 140 relative to the voice coil assembly field moves the control arm of turbine 112 to vary the turbocharger geometry.

Armature coil 142 is connected to a suitable current source 144 which is preferably a pulse width modulation driven transistor driven by control logic 84 (FIG. 2). Electromagnet coils 120 and 122 may be suitably connected to a direct current power source at connection 124.

In operation, coil 142 is located within the field of the electromagnet (or permanent magnets) or combination of electromagnets and permanent magnets. As such, charged particles traveling with a velocity through coil 142 and within the magnetic field experience a force generally according to the equation:

$$F = qv \times B$$

Wherein F is the force vector experienced by the charged particle, q is the charge on the particle, v is the velocity vector of the particle, and B is the magnetic flux density vector (in this case due to the electromagnets).

Appropriate arrangement of an armature coil within a field, for example as shown, results in a force on coil 142 that generally varies in proportion with variations of the current (which is proportional to the velocity vector) through the coil. As such, proper arrangement of a spring 146 abutting housing portion 150 that is fixed with respect to the field, and placement of a spring seat 148 that is affixed to the armature, produces a spring force that varies proportionately to displacement.

As mentioned previously, preferred embodiments of the present invention utilize position feedback to control the position of the armature relative to the field. Position feedback may be provided with, for example, a linear resistive transducer generally indicated at 152. Linear resistive transducer 152 includes a linear resistor 154 and a wiper 156. Preferably, the linear resistor is affixed to the flux carrying core and is fixed with respect to the field, while the wiper 156 is affixed to the armature and moves with the armature. As such, the resistence between leads 158 and 160 varies proportionally with the position of the armature with respect to the field.

With reference now to FIG. 4, a method of the present invention will now be described. At block 172, a desired turbocharger geometry is determined. At block 174, the voice coil assembly is actuated in accordance with the desired turbocharger geometry.

Of course, it is to be appreciated that the voice coil assembly may take many forms, and the form illustrated in FIG. 3 is illustrated for convenience in understanding the theory of operation of the voice coil assembly. Further, it is to be appreciated that preferred embodiments of the present invention utilize closed loop control of the voice coil assembly based on position in addition to closed loop control based on actual boost pressure to effectively control the turbocharger geometry and improve engine performance.

Of course, other variations for control in accordance with the present invention are to be appreciated by those of ordinary skill in the art. Further, it is to be appreciated that voice coil assemblies may have a number of different arrangements for the magnets, which may be permanent magnets, electromagnets, or combinations, and further that the armature arrangement may also take many forms.

Embodiments of the present invention have additional advantages than those specifically mentioned above, as is appreciated by one of ordinary skill in the art of VGT systems. For example, using a look-up table to determine a desired turbocharger geometry as a position for the armature relative to the field allows for non-linear VGT system to be linearized. Further, it is very advantageous that embodiments of the present invention can move the voice coil assembly (and the VGT) to any position at any time, because the voice coil assembly is driven by the vehicle electrical system.

Figure 6:
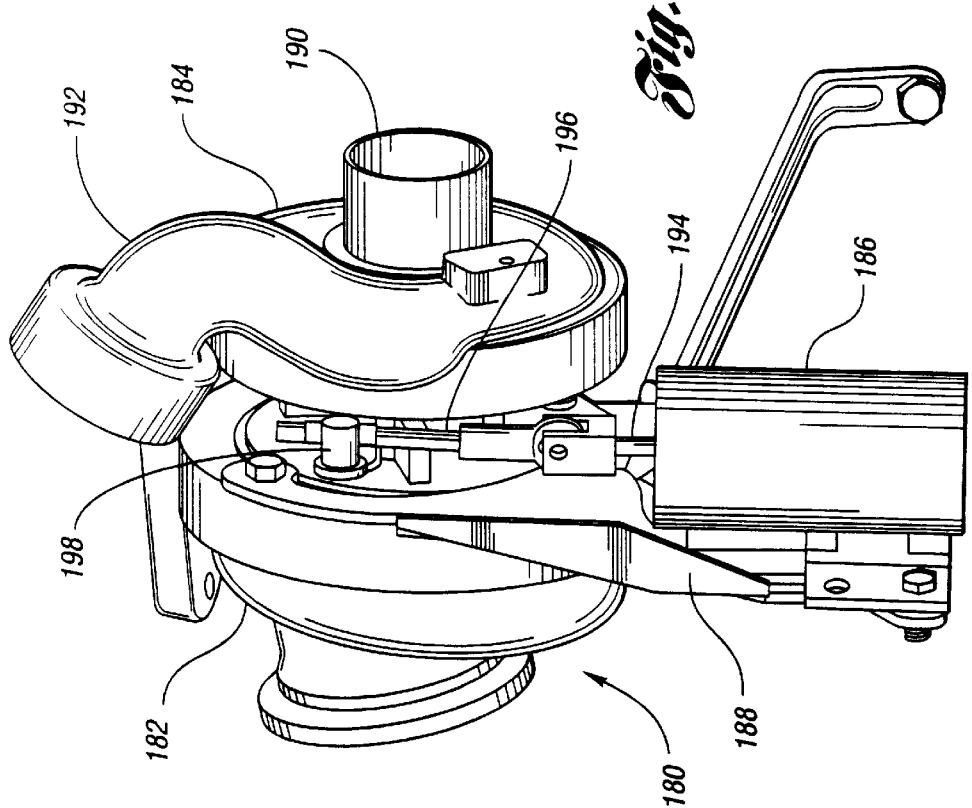
FIG. 6 is another view of the variable geometry turbocharger of FIG. 5.
Figure 5:
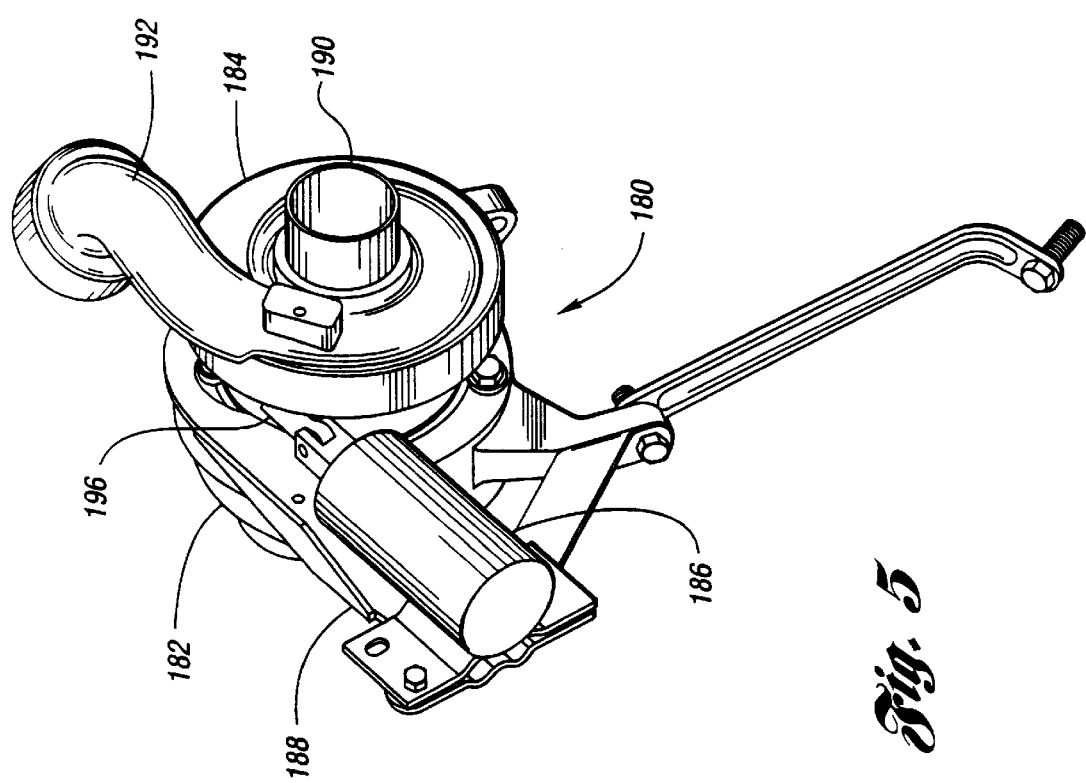
FIG. 5 illustrates a variable geometry turbocharger of the present invention, showing an in-cylinder voice coil assembly.

With reference to FIGS. 5 and 6, a variable geometry turbocharger is generally indicated at 180. A turbine 182 is connected to a compressor 184. The voice coil assembly is housed in a cylinder 186, and mounted by a bracket 188. Compressor 184 draws air through air intake 190 and has increased pressure at outlet 192. The voice coil assembly drives output member 194 over a linear stroke range. Two-pivot linkage 196 converts the motion of member 194 into linear motion of member 198 to change the turbocharger geometry.

While the best mode for carrying out the invention has been described in detail, those familiar with the art to which this invention relates will recognize various alternative designs and embodiments for practicing the invention as defined by the following claims.

What is claimed is:

1. A variable geometry turbocharging system for use in an internal combustion engine including an engine controller, the system comprising:
   a variable geometry turbocharger configured with a changeable geometry; and
   a voice coil assembly including a field and an armature, the voice coil assembly being actuatable to move the armature relative to the field, and the voice coil assembly being connected to the turbocharger such that movement of the armature relative to the field changes the geometry of the turbocharger.

2. The system of claim 1 wherein the engine controller is configured to generate a signal indicative of a desired turbocharger geometry based on at least one engine operating condition, and wherein the system further comprises:
   control logic configured to receive the engine controller signal and to actuate the voice coil assembly in accordance with the engine controller signal.

3. The system of claim 2 wherein the engine controller is configured to determine the desired turbocharger geometry based on engine rpm.

4. The system of claim 2 wherein the engine controller is configured to determine the desired turbocharger geometry based on a demanded engine torque.

5. The system of claim 2 wherein the engine controller is configured to determine the desired turbocharger geometry based on a desired boost pressure for the engine.

6. The system of claim 5 further comprising:
   a sensor configured to measure an actual boost pressure for the engine and to provide a signal to the engine controller indicative of the actual boost pressure, wherein the engine controller is configured to determine the desired turbocharger geometry based on the desired boost pressure and the actual boost pressure for the engine.

7. The system of claim 5 wherein the engine controller is configured to determine the desired boost pressure from a look up table that is indexed by at least one engine condition from the group consisting of: engine rpm and demanded engine torque.

8. The system of claim 2 wherein the engine controller generates the engine controller signal as a pulse width modulated signal wherein a signal duty cycle indicates the desired turbocharger geometry.

9. The system of claim 8 wherein the duty cycle ranges from about 5% to about 95%.

10. The system of claim 1 wherein the voice coil assembly is connected so as to be electrically driven by a vehicle battery.

11. The system of claim 1 wherein the voice coil assembly has a full motion range for the armature relative to the field of about 2.5 centimeters.

12. A variable geometry turbocharging system for use in an internal combustion engine including an engine controller configured to generate a signal indicative of a desired turbocharger geometry based on at least one engine operating condition, the system comprising:

a variable geometry turbocharger configured with a changeable geometry;

a voice coil assembly including a field and an armature, the voice coil assembly being actuatable to move the armature relative to the field, and the voice coil assembly being connected to the turbocharger such that movement of the armature relative to the field changes the geometry of the turbocharger;

a position sensor configured to measure the position of the armature relative to the field and having an output indicative of the measured position; and control logic configured to receive the engine controller signal and the position sensor output, and to actuate the voice coil assembly in accordance with the engine controller signal and the position sensor output to track turbocharger geometry to the desired turbocharger geometry.

13. The system of claim 12 wherein the position sensor comprises:

a linear resistive transducer including a linear resistor and a wiper configured such that the wiper moves along the linear resistor as the armature moves relative to the field.

14. The system of claim 13 wherein the wiper is fixed relative to the armature and the linear resistor is fixed relative to the field.

15. The system of claim 12 wherein the voice coil assembly and the control logic are configured to provide a full motion range response of at most about 150 milliseconds.

16. The system of claim 14 wherein the voice coil assembly and the control logic are configured to provide a full motion range response of at most about 100 milliseconds.

17. The system of claim 14 wherein the control logic is configured to determine a position error signal based on the engine controller signal and the position sensor output and to actuate the voice coil assembly in accordance with the error signal to track turbocharger geometry to the desired turbocharger geometry.

18. The system of claim 17 wherein the control logic is configured to actuate the voice coil assembly in accordance with the error signal and at least one time dependent control term and a proportional control term.

19. The system of claim 18 wherein the at least one time dependent control term includes an integral term.

20. The system of claim 18 wherein the at least one time dependent control term includes a derivative term.

21. The system of claim 12 wherein the armature includes a coil, and wherein the control logic is configured to actuate the voice coil assembly by generating a pulse width modulated signal in which a duty cycle indicates the desired turbocharger geometry and applying the pulse width modulated signal to the coil.

22. A variable geometry turbocharging system comprising:

an internal combustion engine having a plurality of cylinders;

an engine controller configured to generate a signal indicative of a desired turbocharger geometry based on a desired boost pressure for the engine;

a variable geometry turbocharger configured with a changeable geometry and arranged to deliver air/fuel mixture at increased pressures to the engine;

a voice coil assembly including a field and an armature, the voice coil assembly being actuatable to move the armature relative to the field, and the voice coil assembly being connected to the turbocharger such that movement of the armature relative to the field changes the geometry of the turbocharger;

a position sensor configured to measure the position of the armature relative to the field and having an output indicative of the measured position; and control logic configured to receive the engine controller signal and the position sensor output, and to actuate the voice coil assembly in accordance with the engine controller signal and the position sensor output to track turbocharger geometry to the desired turbocharger geometry.

23. The system of claim 22 further comprising:

a sensor configured to measure an actual boost pressure for the engine and to provide a signal to the engine controller indicative of the actual boost pressure, wherein the engine controller is configured to determine the desired turbocharger geometry based on the desired boost pressure and the actual boost pressure for the engine.

24. The system of claim 22 wherein the engine controller is configured to determine the desired boost pressure from a look up table that is indexed by at least one engine condition from the group consisting of: engine rpm and demanded engine torque.

25. A method for controlling a variable geometry turbocharging system including a variable geometry turbocharger with a changeable geometry, the method comprising:

determining a desired turbocharger geometry based on at least one engine operating condition; and actuating a voice coil assembly in accordance with the desired turbocharger geometry, the voice coil assembly including a field and an armature and being actuatable to move the armature relative to the field, and the voice coil assembly being connected to the turbocharger such that movement of the armature relative to the field changes the geometry of the turbocharger.

* * * * *